March 12, 1929.  P. W. SAITTA  1,705,420
ELEVATING DEVICE
Filed April 6, 1927   3 Sheets-Sheet 3
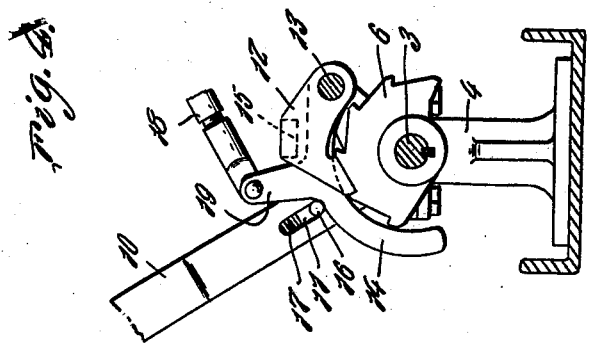
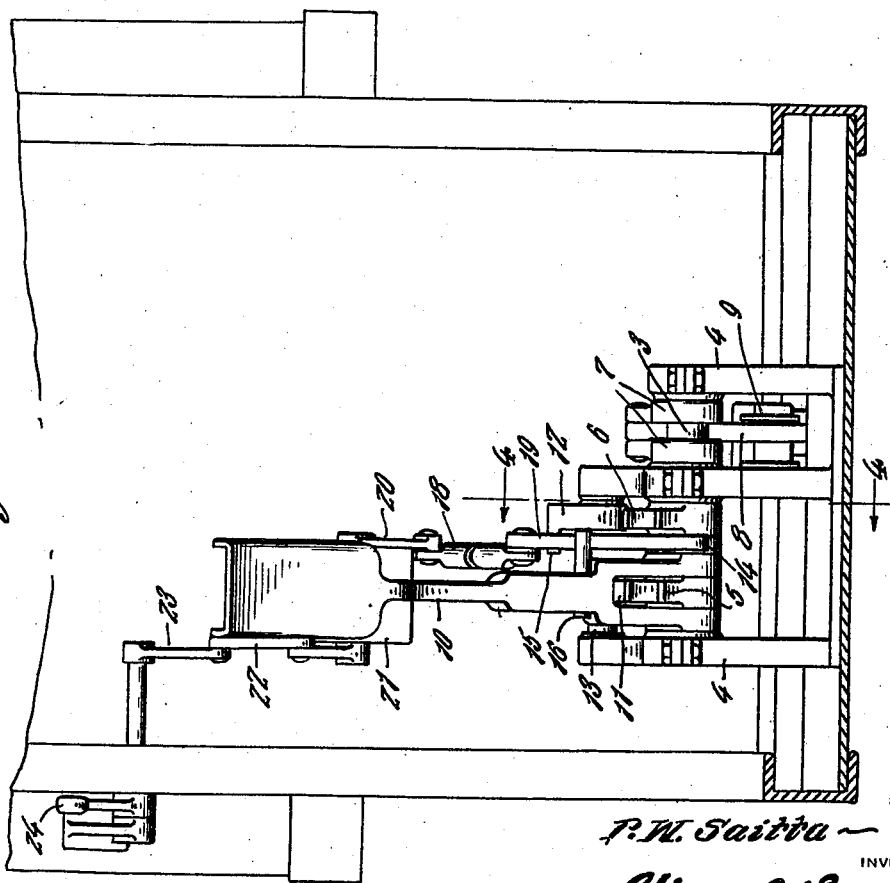
P. W. Saitta
INVENTOR
BY Victor J. Evans
ATTORNEY Patented Mar. 12, 1929.

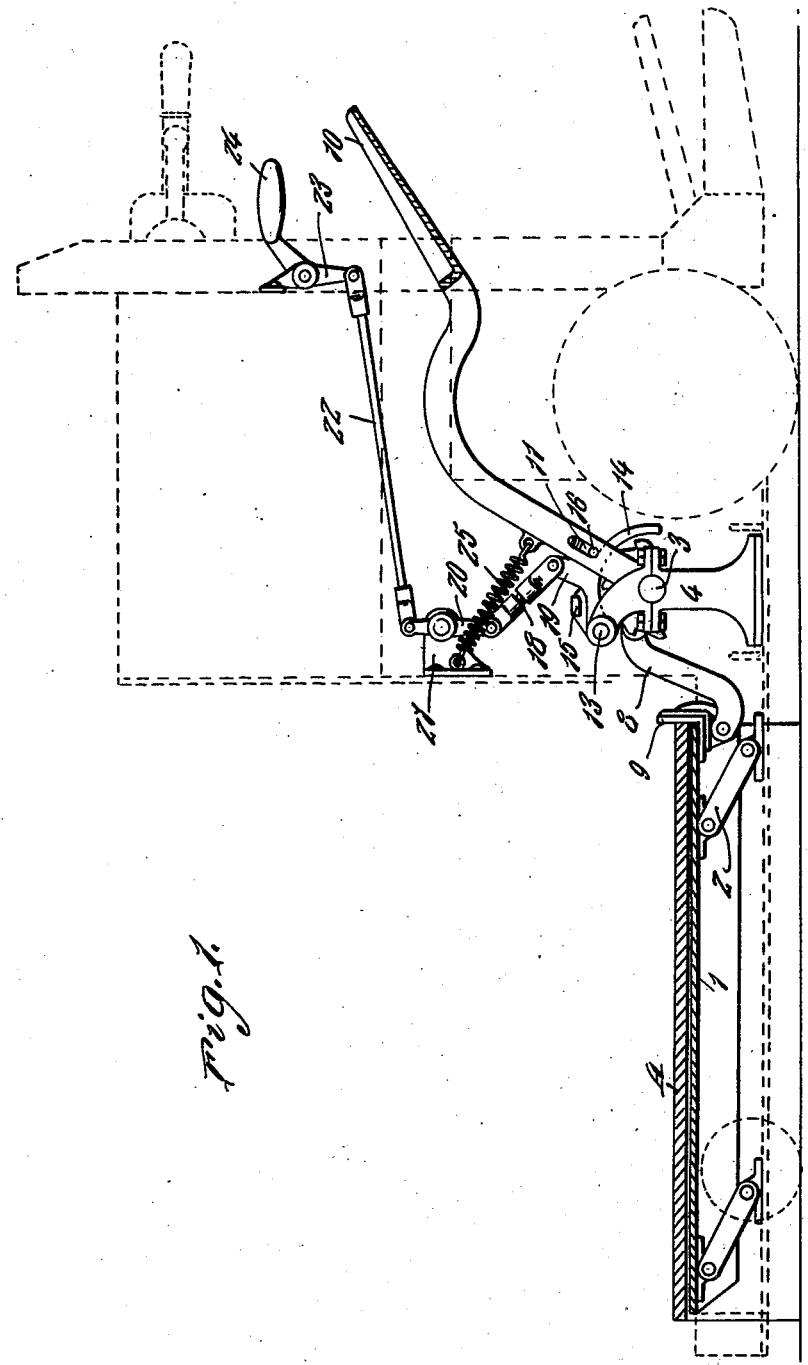

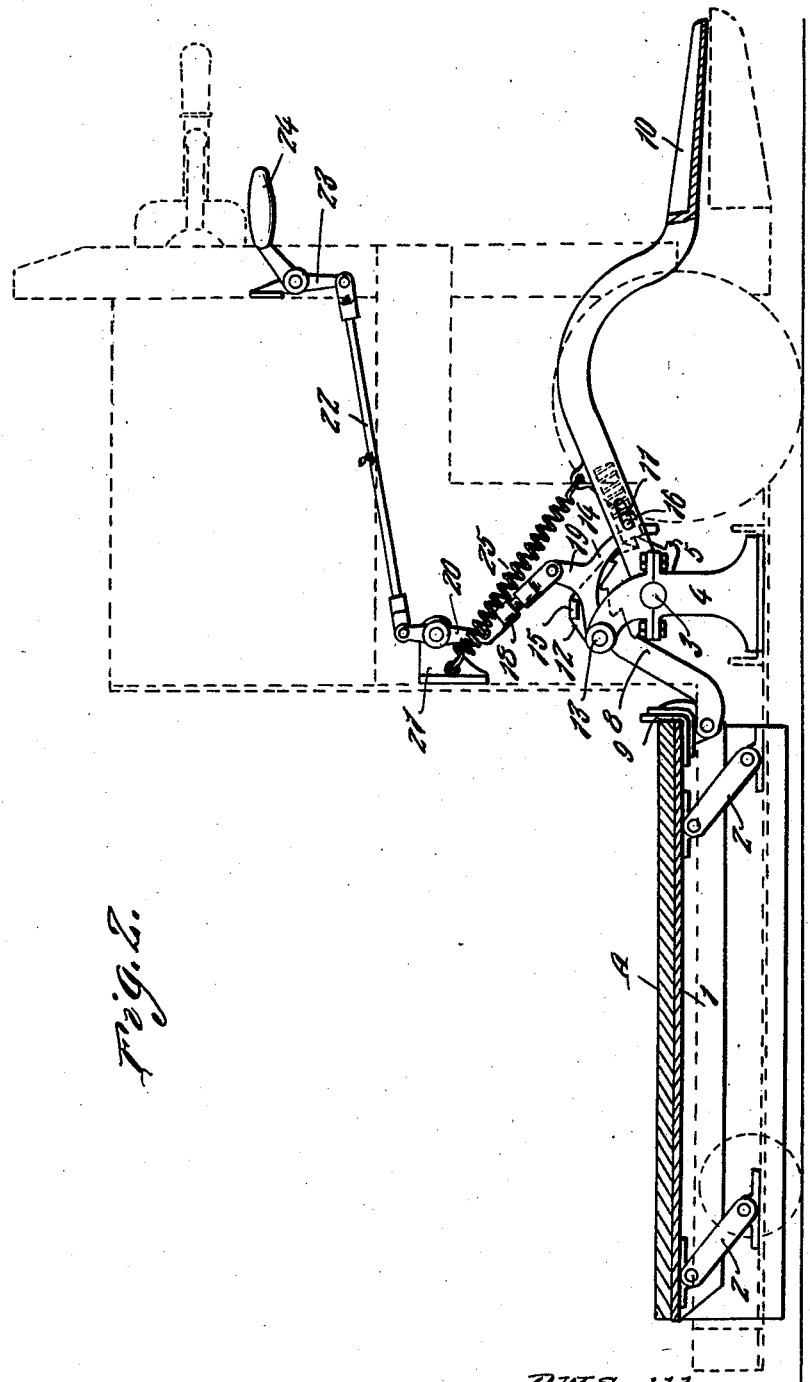

1,705,420

UNITED STATES PATENT OFFICE.

PHILIP W. SAITTA, OF LEBANON, PENNSYLVANIA, ASSIGNOR TO CRESCENT TRUCK COMPANY, OF LEBANON, PENNSYLVANIA, A CORPORATION OF PENNSYLVANIA.

ELEVATING DEVICE.

Application filed April 6, 1927. Serial No. 181,502.

This invention relates to an electric industrial truck of the elevating platform type, the general object of the invention being to provide means for elevating the platform by means of a foot pedal which is operated by the truck driver from the operating platform of the truck.

Another object of the invention is to provide locking means for holding the platform elevated, with hand operated means for releasing the locking means to permit the platform to return to its normal lowered position.

A still further object of the invention is to provide ratchet means for communicating the movement of the foot pedal to the raising means of the platform.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing the truck in dotted lines, the elevating means in full lines and the platform in section.

Figure 2 is a similar view but showing the parts with the platform in raised position.

Figure 3 is a rear view with parts in section.

Figure 4 is a section on line 4—4 of Figure 3.

In these views, 1 indicates the platform of the truck which is connected with a portion of the base of the truck by the links 2 so that the platform can be raised and lowered. A shaft 3 is journaled in the uprights 4 and a pair of toothed sectors 5 and 6 is keyed to the shaft. A pair of arms 7 is also keyed or otherwise fastened to the shaft and a link 8 is pivoted between these arms and has a bracket 9 pivoted to its lower end, which bracket is connected with the inner end of the platform 1.

A foot pedal 10 has its forked end rotatably mounted on the shaft 3, the prongs straddling the sector 5 and a spring pressed pawl 11 is carried by said pedal and engages the teeth of the member 5, these parts being so arranged that when the pedal is depressed, the pawl, engaging a tooth of the sector, will cause the sector to move with the pedal and thus the shaft will be rocked.

A pawl 12 is pivotally arranged on a shaft 13 which is carried by a pair of uprights to prevent retrograde movement of the sectors and the shaft 3, as these parts are moved by the depression of the pedal.

The curved releasing lever 14 is pivoted on the shaft 13 and the pawl 12 has a projection 15 which extends over the top of the lever 14 so that when said lever is raised, it will engage the projection and thus raise the pawl out of engagement with the sector 5. This curved lever also engages a pin 16 which is carried by the pawl 11 and which extends through a slot 17 formed in the pedal, so that when the lever 14 is raised, this pawl 11 will also be lifted out of engagement with its sector.

An adjustable link 18 connects an arm 19 on the lever 14 with a small lever 20 pivoted to a bracket 21 connected to a part of the truck, and the upper end of this lever 20 is connected by a link 22 with a bell crank 23, the upper part of which is formed with a handle 24 so that the elevation of the handle 24 will cause the connecting parts to raise the lever 14 to lift the pawls.

Both the pedal and the handle 24 are so located that they can be conveniently reached by an operator standing on the operator's platform of the truck, and as will be seen, when the operator wishes to raise the platform 1, it is simply necessary to depress the foot pedal by his foot, which will rock the shaft 3 through means of the ratchet mechanism described, and this rocking movement will lift the link 8 and thereby raise the platform 1. When the foot is raised, a spring 25, which connects the pedal with the bracket 21, will return the pedal to raised position again, and in this action, the pawl 11 ratchets over the member 5, which member, together with the member 6 and the shaft, is prevented from moving with the pedal through means of the pawl 12 engaging the ratchet member 6. Then the pedal can be depressed again to raise the platform 1 another step and so on until the platform has been raised as far as desired. When the platform is to be lowered it is simply necessary to depress the handle 24 to cause the lever 14 to release the pawl 12 which will permit free movement of the shaft 3 and thus the weight of the platform will return the parts to their normal position with the platform in its lowest position.

Thus with this improvement, the truck can be moved to a point to position its platform under a skid A and then the platform can be raised by means of the foot pedal to elevate the skid. Then the skid, with the load thereon, can be transported to any point desired, and by lowering the platform through means of the handle 24, the skid can be deposited at its destination and the truck moved to another point to receive a new load. With this invention, the truck can be loaded and unloaded without the operator leaving his platform.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a truck having a vertically movable platform, a rock shaft journalled in a part of the truck, an arm on the shaft, a link connecting the arm with the part on the platform whereby movement of the shaft will act to move the platform, a pair of toothed sectors on the shaft, a foot pedal having a forked end the prongs of which rotatably engage the shaft, one on each side of one of the sectors, a spring pressed pawl carried by the pedal and engaging said sector, whereby oscillation of the pedal will rotate the shaft, a locking pawl engaging the second sector for preventing retrograde movement of the shaft, a releasing lever pivoted to the shaft, a projection on each pawl engaged by the lever whereby the pawls will be moved to releasing position when the lever is raised, a hand lever and means for connecting the hand lever to the releasing lever.

In testimony whereof I affix my signature.

PHILIP W. SAITTA.